US012625330B2

(12) United States Patent
Lau et al.

(10) Patent No.: US 12,625,330 B2
(45) Date of Patent: May 12, 2026

(54) PACKAGE STRUCTURE AND MANUFACTURING METHOD THEREOF

(71) Applicant: Unimicron Technology Corp., Taoyuan City (TW)

(72) Inventors: John Hon-Shing Lau, Taoyuan City (TW); Tzyy-Jang Tseng, Taoyuan City (TW)

(73) Assignee: Unimicron Technology Corp., Taoyuan City (TW)

( * ) Notice: Subject to any disclaimer, the term of this patent is extended or adjusted under 35 U.S.C. 154(b) by 262 days.

(21) Appl. No.: 18/503,194

(22) Filed: Nov. 7, 2023

(65) Prior Publication Data

US 2025/0147249 A1      May 8, 2025

(51) Int. Cl.
G02B 6/42                (2006.01)
(52) U.S. Cl.
CPC ......... G02B 6/4249 (2013.01); G02B 6/4293 (2013.01)
(58) Field of Classification Search
None
See application file for complete search history.

(56) References Cited

U.S. PATENT DOCUMENTS

| | | | | | |
|---|---|---|---|---|---|
| 10,162,139 | B1 * | 12/2018 | Wang | ..................... | G02B 6/122 |
| 10,866,376 | B1 * | 12/2020 | Ghiasi | .................. | G02B 6/4292 |
| 11,336,376 | B1 * | 5/2022 | Xie | ..................... | H04B 10/572 |
| 11,688,681 | B2 | 6/2023 | Chen | | |
| 11,694,939 | B2 * | 7/2023 | Huang | ................ | H01L 23/3185 |
| | | | | | 257/787 |
| 2013/0050949 | A1 * | 2/2013 | Morris | ................ | H01L 23/4006 |
| | | | | | 29/830 |
| 2018/0196196 | A1 * | 7/2018 | Byrd | ........................ | G02B 6/14 |
| 2019/0333905 | A1 * | 10/2019 | Raghunathan | .......... | H01L 24/09 |

(Continued)

FOREIGN PATENT DOCUMENTS

| | | |
|---|---|---|
| TW | 202114130 | 4/2021 |
| TW | 202226480 | 7/2022 |

OTHER PUBLICATIONS

Sandeep Razdan et al., "Advanced 2.5D and 3D packaging technologies for next generation Silicon Photonics in high performance networking applications", 2022 IEEE 72nd Electronic Components and Technology Conference, Jun. 3, 2022, pp. 428-435.

(Continued)

*Primary Examiner* — Jerry Rahll
(74) *Attorney, Agent, or Firm* — JCIPRNET

(57)                ABSTRACT

A package structure includes a package substrate, an application specific integrated circuit (ASIC), a plurality of optoelectronic assemblies, and a plurality of organic interposers. The ASIC is disposed on the package substrate and electrically connected to the package substrate. The optoelectronic assemblies are separately disposed on the package substrate and surround the ASIC. Each of the plurality of optoelectronic assemblies includes an electronic integrated circuit (EIC), a photonic integrated circuit (PIC), and a plurality of hybrid bonding pads. The EIC is bonded to the PIC through the plurality of hybrid bonding pads. The plurality of organic interposers are separately disposed on the package substrate and surround the ASIC. The optoelectronic assemblies are electrically connected to the package substrate through the plurality of organic interposers.

11 Claims, 4 Drawing Sheets

(56)     References Cited

U.S. PATENT DOCUMENTS

| | | | |
|---|---|---|---|
| 2021/0096310 A1* | 4/2021 | Chang | H01L 24/19 |
| 2022/0199600 A1* | 6/2022 | Zhang | H01L 25/167 |
| 2022/0350077 A1* | 11/2022 | Xie | G02B 6/43 |
| 2022/0365274 A1* | 11/2022 | Huang | G02B 6/13 |
| 2023/0384543 A1 | 11/2023 | Hsia et al. | |

OTHER PUBLICATIONS

"Office Action of Taiwan Related Application No. 113107178", issued on Dec. 3, 2024, pp. 1-6.

"Office Action of Taiwan Related Application, Application No. 113107178", issued on Mar. 17, 2025, p. 1-p. 6.

"Office Action of Taiwan Related Application, Application No. 113107178", issued on Aug. 1, 2025, p. 1-p. 7.

* cited by examiner

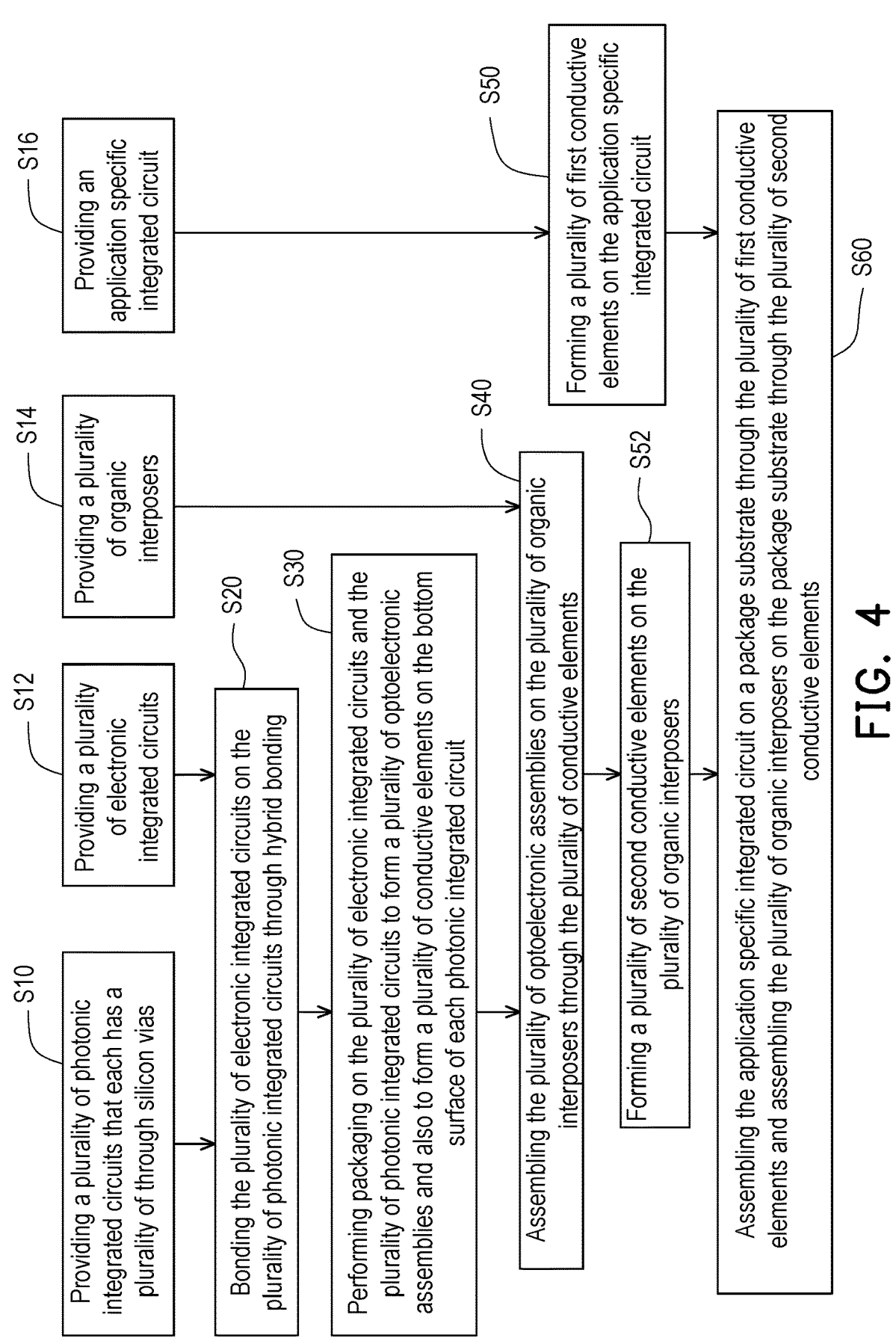

S10
Providing a plurality of photonic integrated circuits that each has a plurality of through silicon vias S12
Providing a plurality of electronic integrated circuits S14
Providing a plurality of organic interposers S16
Providing an application specific integrated circuit S20
Bonding the plurality of electronic integrated circuits on the plurality of photonic integrated circuits through hybrid bonding S30
Performing packaging on the plurality of electronic integrated circuits and the plurality of photonic integrated circuits to form a plurality of optoelectronic assemblies and also to form a plurality of conductive elements on the bottom surface of each photonic integrated circuit S40
Assembling the plurality of optoelectronic assemblies on the plurality of organic interposers through the plurality of conductive elements S52
Forming a plurality of second conductive elements on the plurality of organic interposers S50
Forming a plurality of first conductive elements on the application specific integrated circuit S60
Assembling the application specific integrated circuit on a package substrate through the plurality of first conductive elements and assembling the plurality of organic interposers on the package substrate through the plurality of second conductive elements

FIG. 4

PACKAGE STRUCTURE AND MANUFACTURING METHOD THEREOF

BACKGROUND

Technical Field

The disclosure relates to an integrated circuit structure and manufacture method thereof, specifically to a package structure and manufacturing method thereof.

Description of Related Art

Co-packaged optics (CPO) have been prominent in recent years. A network switch released by Intel Corporation and Broadcom Corporation delivers 25.6 T bandwidth performance, wherein electronic integrated circuit (EIC) and photonic integrated circuits (PIC) are placed side by side. However, as demand for 51.2 T network switch bandwidth rises, the co-packaged optics solution fails to keep up and results in a development bottleneck of co-packaged optics density.

SUMMARY

The disclosure provides a package structure of higher density and greater performance.

The disclosure further provides a package structure manufacturing method suited for manufacturing the package structure.

The package structure of the disclosure includes a package substrate, an application specific integrated circuit, a plurality of optoelectronic assemblies, and a plurality of organic interposers. The application specific integrated circuit is disposed on the package substrate and electrically connected to the package substrate. The plurality of optoelectronic assemblies are disposed on the package substrate, separated from each other and surrounding the application specific integrated circuit. Each of the plurality of optoelectronic assemblies includes an electronic integrated circuit, a photonic integrated circuit, and a plurality of hybrid bonding pads. The electronic integrated circuit is bonded on the photonic integrated circuit through the plurality of hybrid bonding pads. The plurality of organic interposers are disposed on the package substrate, separated from each other and surrounding the application specific integrated circuit. The plurality of optoelectronic assemblies are electrically connected to the package substrate through the plurality of organic interposers.

In an embodiment of the disclosure, each of the plurality of optoelectronic assemblies further includes an optical fiber cable that is connected to the photonic integrated circuit.

In an embodiment of the disclosure, each of the plurality of optoelectronic assemblies further includes an encapsulant that covers the electronic integrated circuit and the photonic integrated circuit therein and exposes a bottom surface of the photonic integrated circuit.

In an embodiment of the disclosure, the chip package structure further includes a plurality of conductive elements disposed between the plurality of optoelectronic assemblies and the plurality of organic interposers. Each of the plurality of photonic integrated circuits has a plurality of through silicon vias and is electrically connected to a corresponding organic interposer through the plurality of through silicon vias and the plurality of conductive elements.

In an embodiment of the disclosure, each of the plurality of conductive elements includes a bump or a Cu-pillar with solder bump cap.

In an embodiment of the disclosure, the package structure further includes a plurality of first conductive elements and a plurality of second conductive elements. The plurality of first conductive elements are disposed between the application specific integrated circuit and the package substrate, wherein the application specific integrated circuit is electrically connected to the package substrate through the plurality of first conductive elements. The plurality of second conductive elements are disposed between the plurality of organic interposers and the package substrate, wherein the plurality of organic interposers are electrically connected to the package substrate through the plurality of second conductive elements.

In an embodiment of the disclosure, the package substrate further includes a connecting circuit, and the plurality of first conductive elements are electrically connected to the plurality of second conductive elements through the connecting circuit.

In an embodiment of the disclosure, each of the plurality of first conductive elements and each of the plurality of second conductive elements separately includes a solder ball.

In an embodiment of the disclosure, each of the plurality of organic interposers includes a redistribution layer structure.

In an embodiment of the disclosure, one side of the application specific integrated circuit includes at least one organic interposer among the plurality of organic interposers and four optoelectronic assemblies among the plurality of optoelectronic assemblies.

The manufacturing method for the package structure of the disclosure includes the following steps. The plurality of optoelectronic assemblies are provided. Each of the plurality of optoelectronic assemblies includes the electronic integrated circuit, the photonic integrated circuit, and the plurality of hybrid bonding pads. The electronic integrated circuit is bonded on the photonic integrated circuit through the plurality of hybrid bonding pads. A plurality of organic interposers are provided. The plurality of optoelectronic assemblies are assembled on the plurality of organic interposers. The application specific integrated circuit is assembled on the package substrate, wherein the application specific integrated circuit is electrically connected to the package substrate. The plurality of organic interposers and the plurality of optoelectronic assemblies assembled thereon are assembled onto the package substrate. The plurality of organic interposers and the plurality of optoelectronic assemblies assembled thereon surround the application specific integrated circuit and are electrically connected to the package substrate.

In light of the foregoing, in package structure design of the disclosure, the electronic integrated circuit in each of the plurality of optoelectronic assemblies is bonded on the photonic integrated circuit therein through the plurality of hybrid bonding pads, while each of the plurality of optoelectronic assemblies is electrically connected to the package substrate through one of the plurality of organic interposers. Through the previously mentioned design, the package structure of the disclosure may have higher density and greater performance.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 is a flowchart illustrating a method for manufacturing the package structure in FIG. 1.

DESCRIPTION OF THE EMBODIMENTS

The embodiments of this disclosure may be comprehended with accompanying drawings and are deemed as a part of the disclosed description. It is to be understood that these drawings of the disclosure are not made to scale. In fact, characteristics of the disclosure may be clearly manifested by freely enlarging or shrinking sizes of drawing elements.

Figure 1:
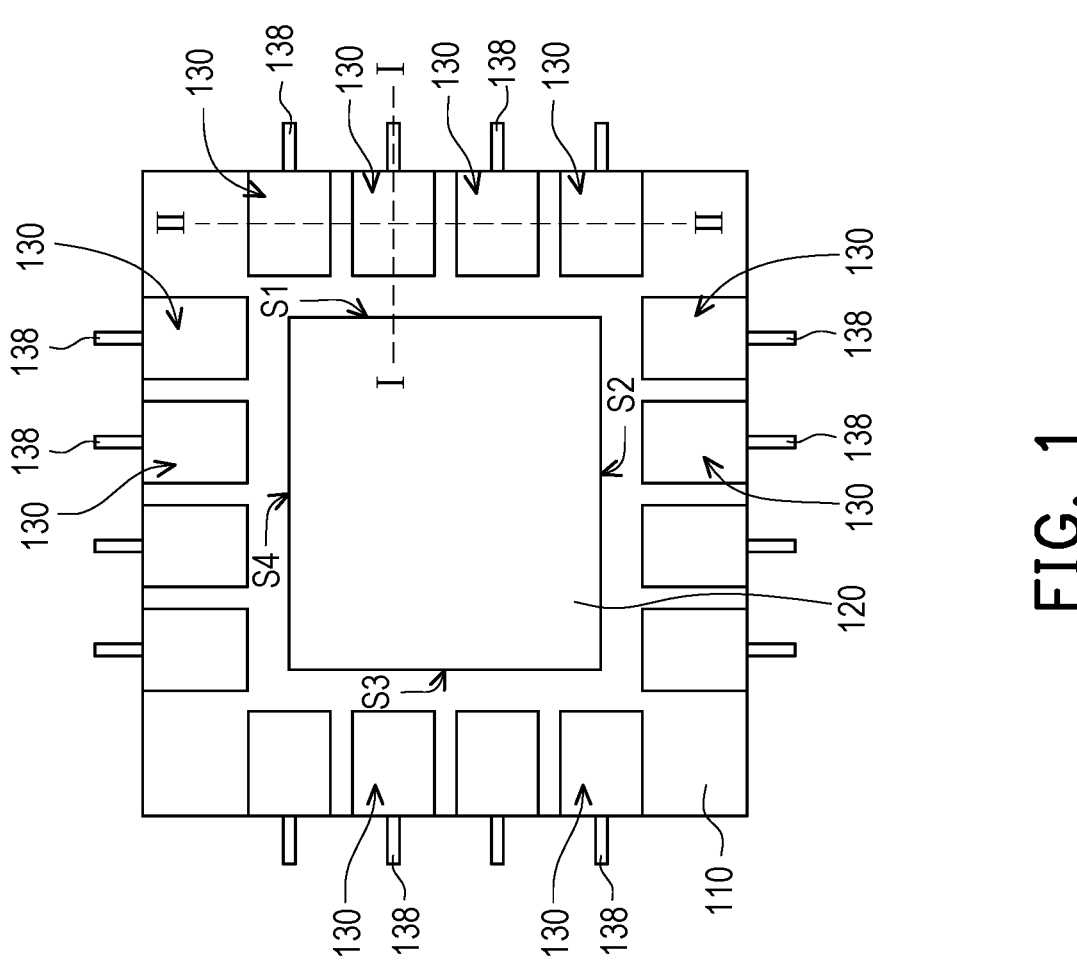
FIG. 1 is a top view illustrating a package structure according to an embodiment of the disclosure.
Figure 2:
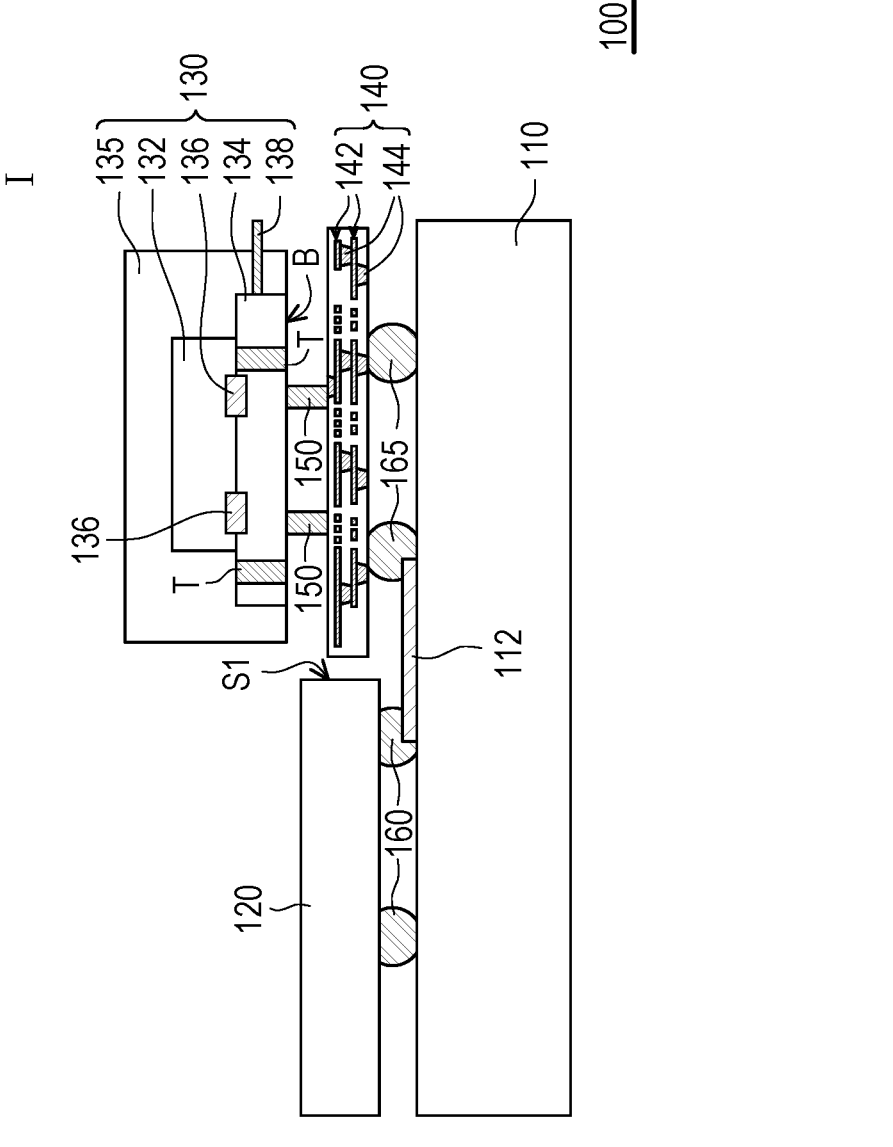
FIG. 2 is a cross-sectional schematic view taken along line I-I in FIG. 1.
Figure 3:
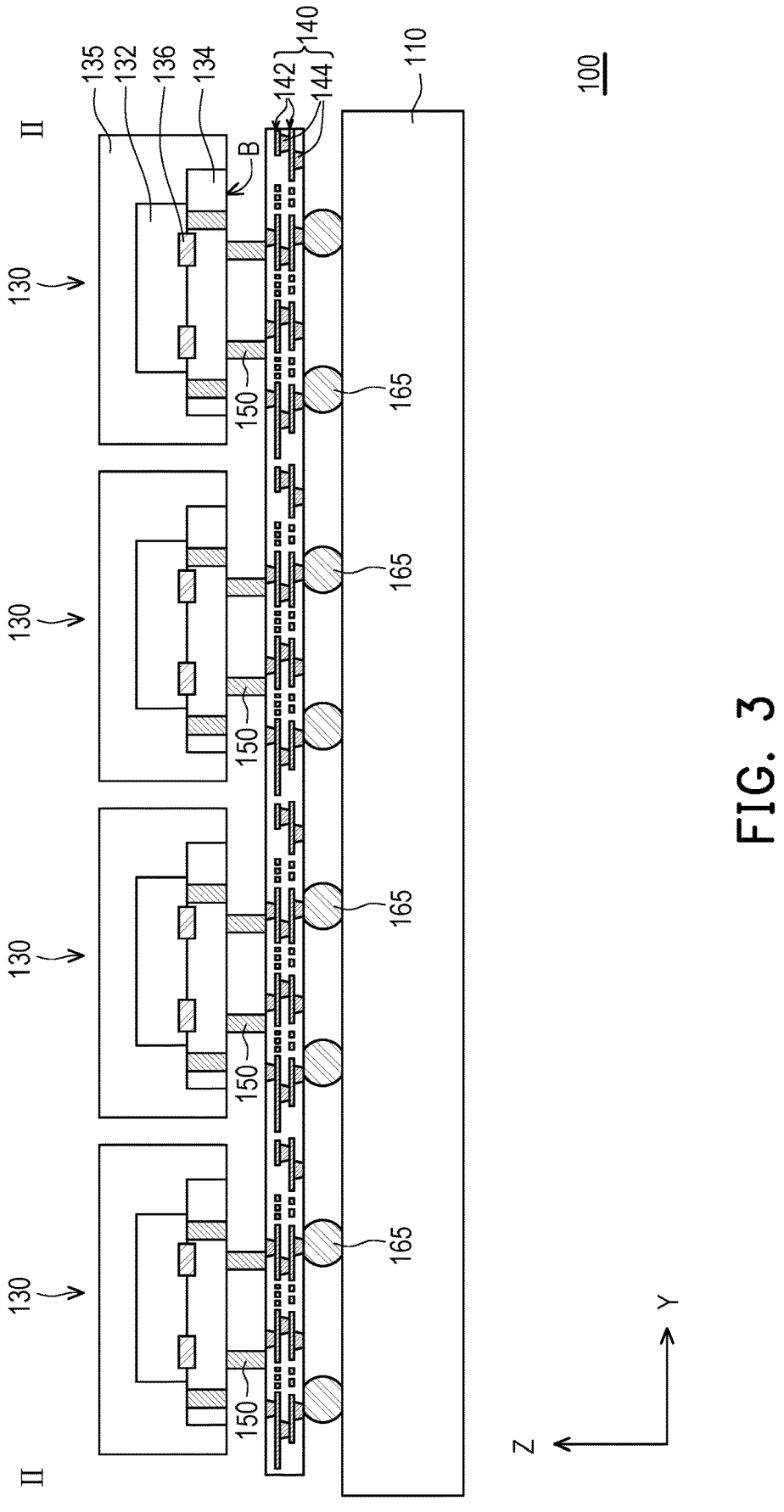
FIG. 3 is a cross-sectional schematic view taken along line II-II in FIG. 1.

FIG. 1 is a top view illustrating a package structure according to an embodiment of the disclosure FIG. 2 is a cross-sectional schematic view taken along line I-I in FIG. 1. FIG. 3 is a cross-sectional schematic view taken along line II-II in FIG. 1. FIG. 4 is a flowchart illustrating a method for manufacturing the package structure in FIG. 1.

Please refer to FIG. 1, FIG. 2, and FIG. 3 at the same time. In the embodiment, a package structure 100 includes a package substrate 110, an application specific integrated circuit 120, a plurality of optoelectronic assemblies 130, and a plurality of organic interposers 140. The application specific integrated circuit 120 is disposed on the package substrate 110 and electrically connected to the package substrate 110. The plurality of optoelectronic assemblies 130 are disposed on the package substrate 110, separated from each other and surrounding the application specific integrated circuit 120. Each of the plurality of optoelectronic assemblies 130 includes an electronic integrated circuit 132, a photonic integrated circuit 134, and a plurality of hybrid bonding pads 136. The electronic integrated circuit 132 is bonded on the photonic integrated circuit 134 through the plurality of hybrid bonding pads 136. The plurality of organic interposers 140 are disposed on the package substrate 110, separated from each other and surrounding the application specific integrated circuit 120. The plurality of optoelectronic assemblies 130 are electrically connected to the package substrate 110 through the plurality of organic interposers 140.

Specifically, in the embodiment, the electronic integrated circuit 132 is stacked on the photonic integrated circuit 134 through the plurality of hybrid bonding pads 136. In other words, the electronic integrated circuit 132 and the photonic integrated circuit 134 are vertically stacked instead of being placed side by side. The photonic integrated circuit 134 is between the electronic integrated circuit 132 and the plurality of organic interposes 140, wherein the photonic integrated circuit 134 has a plurality of through silicon vias T. In an embodiment, a dimension of the photonic integrated circuit 134 may be larger than a dimension of the electronic integrated circuit 132. Moreover, each of the plurality of optoelectronic assemblies 130 further includes an encapsulant 135 that covers the electronic integrated circuit 132 and the photonic integrated circuit 134 and exposes a bottom surface B of the photonic integrated circuit 134. In other words, the encapsulant 135 covers perimeters of the electronic integrated circuit 132 and the photonic integrated circuit 134, merely exposing the bottom surface B of the photonic integrated circuit 134 and a plurality through silicon via ends near the plurality of organic interposers 140. Besides, each of the plurality of optoelectronic assemblies 130 further includes an optical fiber cable 138, wherein the optical fiber cable 138 is connected to the photonic integrated circuit 134. In an embodiment, each of the plurality of optoelectronic assemblies 130 may reach a transmission speed up to 3.2 Tbps.

As indicated in FIG. 1 and FIG. 3, in the embodiment, each side of the application specific integrated circuit 120 (a side S1, a side S2, a side S3, and a side S4) includes at least one organic interposer 140 and four optoelectronic assemblies 130. That is to say, four optoelectronic assemblies 130 are assembled on one organic interposer 140. Hence, the package structure 100 has sixteen optoelectronic assemblies 130 and four organic interposers 140 while the optoelectronic assemblies 130, on four sides S1, S2, S3, and S4 of the application specific integrated circuit 120, surround the application specific integrated circuit 120. In an embodiment, the application specific integrated circuit 120 may be, for example, a 51.2 T switch exchanger yet is not limited thereto.

Please refer to FIG. 2 and FIG. 3 again. Each of the plurality of organic interposers 140 of the embodiment includes a redistribution layer structure that includes a plurality of redistribution circuits 142 and a plurality of conductive blind vias 144, wherein the plurality of redistribution circuits 142 may be electrically connected to each other through the plurality of conductive blind vias 144. In an embodiment, trace width and trace spacing of the plurality of redistribution circuits 142 are both 2 micrometers; i.e., the plurality of redistribution circuits 142 are fine circuit layers.

Moreover, the package structure 100 of the embodiment further includes a plurality of conductive elements 150 disposed between the plurality of optoelectronic assemblies 130 and the plurality of organic interposers 140, wherein the photonic integrated circuit 134 may be electrically connected to its corresponding organic layer 140 through the plurality of through silicon vias T and the plurality of conductive elements 150. In an embodiment, each of the plurality of conductive elements 150 may be, for example, a bump or a Cu-pillar with solder bump cap. Besides, the package structure 100 of the embodiment further includes a plurality of first conductive elements 160 and a plurality of second conductive elements 165. The plurality of first conductive elements 160 are disposed between the application specific integrated circuit 120 and the package substrate 110, wherein the application specific integrated circuit 120 is electrically connected to the package substrate 110 through the plurality of first conductive elements 160. The plurality of second conductive elements 165 are disposed between the plurality of organic interposers 140 and the package substrate, wherein the plurality of organic interposers 140 are electrically connected to the package substrate 110 through the plurality of second conductive elements 165. In an embodiment, each of the plurality of first conductive elements 160 and each of the plurality of second conductive elements 165 may separately be a solder ball. Moreover, the package substrate 110 may include a connecting circuit 112, and the plurality of first conductive elements 160 may be electrically connected to the plurality of second conductive elements 165 through the connecting circuit 112.

Please refer to FIG. 2 and FIG. 4 for a manufacturing method. Firstly, in step S10, the plurality of photonic integrated circuits 134 are provided, and each of the plurality of photonic integrated circuits 134 has the plurality of through silicon vias T. In step S12, the plurality of electronic integrated circuits 132 are provided. In step S14, the plurality of organic interposers 140 are provided. In step S16, the application specific integrated circuits 120 are provided. In an embodiment, the application specific integrated circuit 120 may be, for example, a 51.2 T switch exchanger yet is not limited thereto. It should be mentioned that step S10, step S12, step S14, and step S16 may be reordered to meet different demands and are not limited herein.

In step S20, the plurality of electronic integrated circuits 132 are bonded on the plurality of photonic integrated circuits 134 through hybrid bonding, wherein the plurality of electronic integrated circuits 132 are bonded on the plurality of photonic integrated circuits 134 through the plurality of hybrid bonding pads 136.

In step S30, the plurality of electronic integrated circuits 132 and the plurality of photonic integrated circuits 134 are packaged to form the plurality of optoelectronic assemblies 130 and also to form the plurality of conductive elements 150 on the bottom surface B of each of the plurality of photonic integrated circuits 134. Specifically, each of the plurality of optoelectronic assemblies 130 includes the electronic integrated circuit 132, the photonic integrated circuit 134, and the plurality of hybrid bonding pads 136, wherein the electronic integrated circuit 132 is bonded on the photonic integrated circuit 134 through the plurality of hybrid bonding pads 136. Moreover, each of the plurality of optoelectronic assemblies 130 further includes the encapsulant 135 and the optical fiber cable 138. The encapsulant 135 covers the electronic integrated circuit 132 and the photonic integrated circuit 134 and exposes the bottom surface B of the photonic integrated circuit 134. The optical fiber cable 138 is connected to the photonic integrated circuit 134. In an embodiment, each of the plurality of optoelectronic assemblies 130 may reach the transmission speed up to 3.2 Tbps.

In step S40, the plurality of optoelectronic assemblies 130 are assembled on the plurality of organic interposers 140 through the plurality of conductive elements 150. The plurality of photonic integrated circuits 134 may be electrically connected to its corresponding organic interposers 140 through the plurality of through silicon vias T and the plurality of conductive elements 150. In an embodiment, each of the plurality of conductive elements 150 may be, for example, a bump or a Cu-pillar with solder bump cap.

In step S50, the plurality of first conductive elements 160 are formed on the application specific integrated circuit 120. In step S52, the plurality of second conductive elements 165 are formed on the plurality of organic interposers 140. It should be mentioned that step S50 and step S52 may be reordered to meet different demands and are not limited herein. In an embodiment, each of the plurality of first conductive elements 160 and each of the plurality of second conductive elements 165 may separately be a solder ball, for example.

Lastly, in step S60, the application specific integrated circuit 120 is assembled on the package substrate 110 through the plurality of first conductive elements 160 and the plurality of organic interposers 140 are assembled on the package substrate 110 through the plurality of second conductive elements 165. The application specific integrated circuit 120 may be electrically connected to the package substrate 110 through the plurality of first conductive elements 160. The plurality of organic interposers 140 and the plurality of optoelectronic assemblies 130 assembled thereon surround the application specific integrated circuit 120, and the plurality of organic interposers 140 are electrically connected to the package substrate 110 through the plurality of second conductive elements 165. So far, the package structure 100 is completely manufactured.

In a nutshell, in package structure design of the disclosure, the electronic integrated circuit in each of the plurality of optoelectronic assemblies is bonded on the photonic integrated circuit therein through the plurality of hybrid bonding pads, while the plurality of optoelectronic assemblies are electrically connected to the package substrate through the plurality of organic interposers. Through the previously mentioned design, the package structure of the disclosure may have higher density and greater performance.

Although the disclosure has been described with reference to the aforementioned embodiments, it will be apparent to a person having ordinary skill in the art that modifications to the described embodiments may be made without departing from the spirit of the disclosure. Accordingly, the scope of the disclosure will be defined by the attached claims and not by the above detailed descriptions.

What is claimed is:

1. A package structure, comprising:
   a package substrate;
   an application specific integrated circuit, disposed on the package substrate and electrically connected to the package substrate;
   a plurality of optoelectronic assemblies, disposed on the package substrate, separated from each other and surrounding the application specific integrated circuit, wherein each of the plurality of optoelectronic assemblies comprises an electronic integrated circuit, a photonic integrated circuit, and a plurality of hybrid bonding pads, wherein the electronic integrated circuit is hybrid bonded to the photonic integrated circuit through the plurality of hybrid bonding pads; and
   a plurality of organic interposers, disposed on the package substrate, separated from each other and surrounding the application specific integrated circuit, wherein the plurality of optoelectronic assemblies are electrically connected to the package substrate through the plurality of organic interposers, and the photonic integrated circuit is between the electronic integrated circuit and the plurality of organic interposers.

2. The package structure according to claim 1, wherein each of the plurality of optoelectronic assemblies further comprises an optical fiber cable that is connected to the photonic integrated circuit.

3. The package structure according to claim 1, wherein each of the plurality of optoelectronic assemblies further comprises an encapsulant that covers the electronic integrated circuit and the photonic integrated circuit and exposes a bottom surface of the photonic integrated circuit.

4. The package structure according to claim 1, further comprising:
   a plurality of conductive elements, disposed between the plurality of optoelectronic assemblies and the plurality of organic interposers, wherein the photonic integrated circuit has a plurality of through silicon vias and is electrically connected to each of the corresponding organic interposers through the plurality of through silicon vias and the plurality of conductive elements.

5. The package structure according to claim 4, wherein each of the plurality of conductive elements comprises a bump or a Cu-pillar with solder bump cap.

6. The package structure according to claim 1, further comprising:

a plurality of first conductive elements, disposed between the application specific integrated circuit and the package substrate, wherein the application specific integrated circuit is electrically connected to the package substrate through the plurality of first conductive elements; and a plurality of second conductive elements, disposed between the plurality of organic interposers and the package substrate, wherein the plurality of organic interposers are electrically connected to the package substrate through the plurality of second conductive elements.

7. The package structure according to claim 6, wherein the package substrate further comprises a connecting circuit, and the plurality of first conductive elements are electrically connected to the plurality of second conductive elements through the connecting circuit.

8. The package structure according to claim 6, wherein each of the plurality of first conductive elements and each of the plurality of second conductive elements separately comprises a solder ball.

9. The package structure according to claim 1, wherein each of the plurality of organic interposers comprises a redistribution layer structure.

10. The package structure according to claim 1, wherein one side of the application specific integrated circuit comprises at least one organic interposer among the plurality of organic interposers and four optoelectronic assemblies among the plurality of optoelectronic assemblies.

11. A manufacturing method of a package structure, comprising:

providing a plurality of optoelectronic assemblies, each having an electronic integrated circuit, a photonic integrated circuit, and a plurality of hybrid bonding pads, wherein the electronic integrated circuit is hybrid bonded to the photonic integrated circuit through the plurality of hybrid bonding pads;

providing a plurality of organic interposers;

assembling the plurality of optoelectronic assemblies on the plurality of organic interposers;

assembling an application specific integrated circuit on a package substrate, wherein the application specific integrated circuit is electrically connected to the package substrate; and assembling the plurality of organic interposers and the plurality of optoelectronic assemblies assembled thereon onto the package substrate, wherein the plurality of organic interposers and the plurality of optoelectronic assemblies assembled thereon surround the application specific integrated circuit and are electrically connected to the package substrate, wherein the photonic integrated circuit is between the electronic integrated circuit and the plurality of organic interposers.

* * * * *